United States Patent [19]

Sasnett et al.

[11] Patent Number: 4,648,093
[45] Date of Patent: Mar. 3, 1987

[54] POWER SUPPLY FOR GAS DISCHARGE LASERS

[75] Inventors: Michael W. Sasnett; Robert J. Rorden, both of Los Altos; Larry A. Gibson, Redwood City, all of Calif.

[73] Assignee: Coherent, Inc., Palo Alto, Calif.

[21] Appl. No.: 648,005

[22] Filed: Sep. 6, 1984

[51] Int. Cl.[4] .............................................. H01S 3/00
[52] U.S. Cl. ........................................ 372/38; 372/82
[58] Field of Search .......................... 372/38, 81, 82; 315/289, 238, 242, 243

[56] References Cited

U.S. PATENT DOCUMENTS

| 3,569,862 | 3/1971 | Johnson | 372/82 |
| 4,275,317 | 6/1981 | Laudenslager et al. | 372/81 |
| 4,358,712 | 11/1982 | Filgas et al. | 315/243 |
| 4,363,126 | 12/1982 | Chenausky et al. | 372/82 |
| 4,455,658 | 6/1984 | Sutter | 372/82 |
| 4,464,760 | 8/1984 | Sutter | 372/82 |
| 4,534,035 | 8/1985 | Long | 372/82 |

FOREIGN PATENT DOCUMENTS

| 3240372 | 5/1984 | Fed. Rep. of Germany | 372/82 |
| 115591 | 9/1981 | Japan | 372/82 |
| 57-60879 | 4/1982 | Japan | 372/82 |

OTHER PUBLICATIONS

McMillan; "How to Pick . . . in a Pulsed Laser"; *Laser Focus;* vol. 13, No. 2; Feb. 1977; pp. 62-67.

*Primary Examiner*—William L. Sikes
*Assistant Examiner*—Robert E. Wise
*Attorney, Agent, or Firm*—Limbach, Limbach & Sutton

[57] ABSTRACT

A high voltage power supply for energizing a gas discharge laser in either an enhanced pulse mode or a continuous mode, which power supply is simple to manufacture and minimizes the voltage that other parts of the energizing circuit are required to withstand. The voltage provided by a high voltage DC power supply is boosted by the interaction of first and second reactive components. A first reactance is provided which stores charges at the boosted potential. This charge is provided to the laser to initiate electrical breakdown. The second reactance generates a potential which is additive with respect to the potential provided by the high voltage DC power supply so that the first reactance is charged to a potential equal to the generated potential plus the potential of the high voltage power supply.

5 Claims, 8 Drawing Figures

POWER SUPPLY FOR GAS DISCHARGE LASERS

TECHNICAL FIELD

The present invention is directed, in general, to power supplies for lasers, and, more particularly, to an improved power supply for gas discharge lasers which permits enhanced pulse operation of the laser while also permitting continuous mode operation of the laser.

BACKGROUND ART

Electrical excitation of gas discharge lasers, such as $CO_2$ lasers, requires the use of an excitation source with the following capabilities:

1. Provision of a high voltage to create electrical breakdown in the column of gas that forms the active medium for the laser;

2. Provision of sufficient impedance in series with the gas discharge to maintain controllable current flow through the laser despite a negative dynamic impedance characteristic of the glow discharge in the laser; and 3. Provision of means for repetitively cycling the discharge between the OFF state, i.e. no current flow, through the breakdown phase, to the ON state with regulated current flow, and back to the OFF state again.

In the past, $CO_2$ laser excitation has been accomplished by the use of a high voltage source together with a series current regulator. The current regulator typically consists of a high voltage vacuum tube triode or tetrode connected in the current path. As is well known in the art, a higher peak power can be obtained from a gas discharge laser if the voltage applied to initiate electrical breakdown is substantially higher than that required to maintain a continuous discharge of the laser after the breakdown occurs. For example, a "no-load" voltage two to three times higher than the continuous discharge voltage can be used. However, if the continuous voltage source maintains the "no-load" voltage level when the laser is run continuously, other components of the excitation circuitry, such as the current regulator, must dissipate excessive power. While this approach is feasible, it is clearly not economically viable.

Reference is made to U.S. Pat. No. 4,061,986 assigned to the assignee of the present application, in which an improvement to conventional excitation schemes is disclosed. This improvement includes adding a second high voltage supply having high internal impedance to the primary power supply. When the electrical breakdown in the laser occurs and current starts to flow, the voltage applied by the second supply falls to a low value. There after the primary power supply provides the discharge voltage to the laser. This allows more rapid breakdown and higher initial current than otherwise obtainable, and permits "enhanced-pulse" or "super-pulse" operation of the laser. U.S. Pat. No. 4,061,986 provides additional background on the enhanced pulse mode operation of gas discharge lasers.

The improved power supply of the above referenced patent is capable of providing both continuous operation and pulsed operation over a wide range of current, pulsewidth, and repetition frequency. As such, that invention has found application in a wide variety of uses. Many $CO_2$ lasers, however, are used in dedicated and narrowly defined applications such as ceramic scribing, or printed circuit board drilling, where the laser operates only in the enhanced pulse mode and the pulsewidths are predetermined and fixed, or at most varied only within a small range. Furthermore, there are certain applications, such as $CO_2$ laser surgery, where the laser must be capable of continuous operation, as well as enhanced pulsed operation. However, in the pulsed operation mode, the pulsewidth is predetermined and fixed.

In the above more narrow applications, use of a laser having the cost, size and complexity of a laser having the improved power supply as disclosed in the above-referenced patent becomes difficult to justify. There is therefore need for a power supply which is capable of continuous operation as well as enhanced pulse operation, where the pulsewidth in the pulse mode is predetermined and fixed, and which is significantly less costly, smaller and less complex than previous power supplies.

DISCLOSURE OF INVENTION

These and other problems and disadvantages of previous power supplies for gas discharge lasers are overcome by the present invention of an energizing apparatus comprising means for providing direct current at a fixed potential; means, coupled between the laser and the direct current means, for regulating the magnitude of current flowing through the laser, said current regulating means being switchable between an operative and inoperative condition to permit and to prevent the flow of current through the laser, respectively; first reactance means coupled between the direct current means and the laser for generating a first potential which is proportional to the change in current thereto; second reactance means coupled in shunt across the direct current means and the first reactance means for storing charge at a second potential corresponding to the sum of the first potential from the first reactance means and the potential of the direct current means; and means connected in series with the first reactance means for restricting the flow of current to a single direction, wherein said laser is supplied with a transitory charge at the second potential and at a constant rate when the current regulating means are switched between an inoperative and an operative condition.

The present invention provides a high voltage supply which permits laser operation in the enhanced pulse mode as well as the continuous mode. In the preferred embodiment of the present invention, passive components are utilized which become functional only when the laser is operated in the enhanced pulse mode. Additionally, in accordance with the present invention, the values of the passive components can be selected so that the voltage required to be withstood by other portions of the laser excitation circuitry can be minimized, to thereby reduce stresses placed upon such components, and to permit components of lower breakdown ratings to be utilized.

It is therefore an object of the present invention to provide a high voltage power supply for gas discharge lasers which permits operation of the gas discharge laser in both an enhanced pulse and continuous mode.

It is another object of the present invention to provide a power supply for gas discharge lasers in which first and second reactance components interact to provide a boost voltage which is added to the voltage from a fixed power supply and which thereby collectively provide a transitory high voltage portion for initiating the breakdown phase of the laser and a lower voltage portion for sustaining the discharge of the laser.

It is a further object of the present invention to provide a power supply for a gas discharge laser which permits operation of the laser in an enhanced pulse mode and a continuous operation mode and which minimizes the voltage levels required to be withstood by the other elements of the laser excitation circuitry.

It is still another object of the present invention to provide a power supply for a gas discharge laser which permits both enhanced pulse operation and continuous operation and which is low in cost, small in physical size, and low in complexity.

These and other features, objectives, and advantages of the present invention will be more readily understood upon consideration of the following detailed description of the invention and accompanying drawings.

DETAILED DESCRIPTION OF THE BEST MODE OF THE INVENTION

Figure 1:
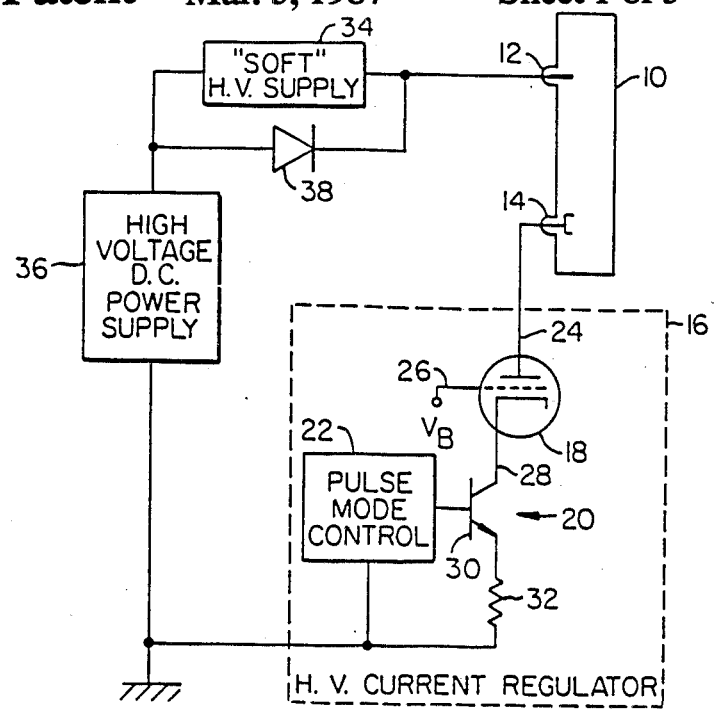
FIG. 1 is a simplified, functional diagram of a prior power supply.

Referring to FIG. 1, a simplified functional block diagram of the power supply disclosed in U.S. Pat. No. 4,061,986 is provided. A laser 10 has a cathode 14 and an anode 12. Connected to cathode 14 is a high voltage current regulator 16. The high voltage regulator can include a high voltage vacuum triode 18, a switching device 20, and pulse mode control circuitry 22. The plate 24 of vacuum tube 18 is coupled to cathode 14 of laser 10. Grid 26 is biased by bias voltage $V_B$, while the cathode 28 is connected to switching device 20. Switching device 20 can be a transistor, such as the NPN transistor 30 shown in FIG. 1. The collector of transistor 30 is connected to the cathode of vacuum tube 18. The base of transistor 30 is driven by a signal supplied from pulse mode control circuit 22. The emitter of transistor 30 is connected to circuit ground by way of resistor 32.

Anode 12 of laser 10 has applied to it a potential which is equal to the sum of the potential from a "soft" high voltage supply 34 and a conventional high voltage DC power supply 36. Diode 38 is connected in parallel with high voltage supply 34.

In operation, "soft" high voltage supply 34 supplies a high impedance potential which is additive with the potential provided by high voltage DC power supply 36. Pulse mode control circuit 22 can be a pulse generator that provides a series of pulses at the desired pulse-width and repetition rate, and can also be energized in a constant signal mode. In the constant signal mode, transistor 30 is maintained continuously in an ON condition. In the pulsed mode, the series of pulses provided by pulse mode control circuit 22 turns on transistor 30 for the duration of each pulse in the sequence of pulses. When transistor 30 is in an ON condition, the current path through laser 10 is completed. As such, current is permitted to flow through the laser.

Initially, the potential applied to laser 10 will be the sum of the voltages provided by soft high voltage supply 34 and high voltage DC power supply 36. This causes the gas within the laser to break down in an enhanced pulse condition. As the gas becomes ionized, its conductivity increases, as such the voltage provided by the "soft" high voltage supply 34, due to its high internal impedance, decreases towards zero. As the voltage across "soft" high voltage supply becomes approximately zero, diode 38 begins to conduct, thus providing only the potential from the high voltage DC power supply 36 to laser 10. In this manner, there is provided an excitation waveform which includes a first portion which is at a high voltage level with high internal impedance, followed by a discharge maintenance portion at a lower voltage level, but at an impedance which is low enough to provide sufficient current to maintain the laser 10 in a continuous operating mode.

As discussed earlier, the "soft" high voltage supply 34 of the referenced patent is prohibitive in cost and complexity for certain applications of gas discharge lasers.

Figure 2:
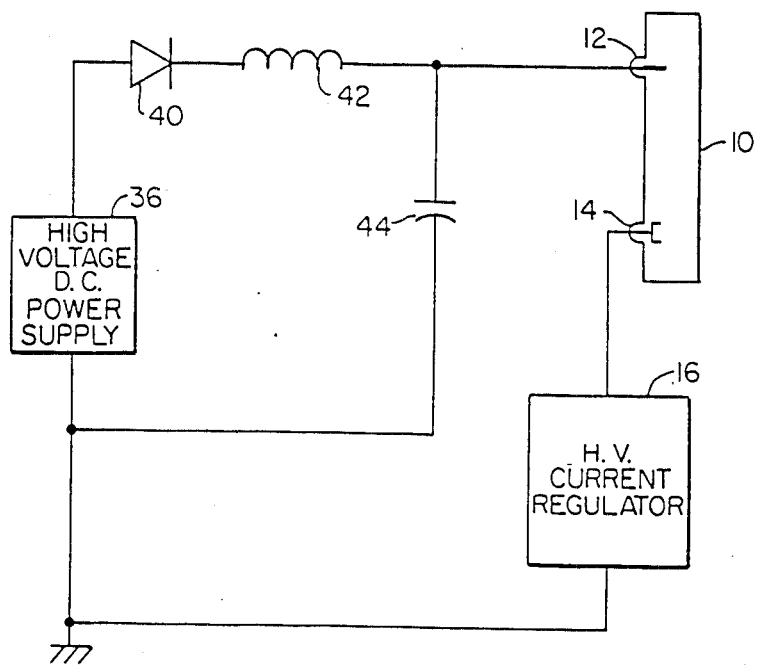
FIG. 2 illustrates the power supply of the present invention.

Referring now to FIG. 2, the present invention will be described in greater detail. Instead of the "soft" high voltage supply 34 in FIG. 1, there are provided three passive components: a diode 40, an inductor 42, and a capacitor 44. Inductor 42 and diode 40 are connected in series between high voltage DC power supply 36 and anode 12 of laser 10. Capacitor 44 is connected in shunt across high voltage DC power supply 36, diode 40, and inductor 42. The cathode of diode 40 is connected to high voltage DC power supply 36 while the anode of diode 40 is connected to inductor 42.

Inductor 42 and capacitor 44 provide reactances which interact with one another to cause a boost in the voltage applied to the anode 12 of laser 10. Inductor 42 and capacitor 44 can be characterized as providing a resonant circuit, the resonance of which operates to generate a voltage across capacitor 44 which is substantially greater than the voltage provided by high voltage DC power supply 36.

As is well known in the art, the current through a capacitor can change instantaneously and is proportional to the time rate of change of the voltage across the capacitor. The voltage across the capacitor is described by the integral of the current through the capacitor. Conversely, the voltage across an inductor can change instantaneously and in accordance with the time rate of change of the current through the inductor. As such, a voltage is present across an inductor when the current through the inductor is changing. On the other hand, the current through an inductor changes in accordance with the integral of the voltage across the inductor.

In operation, as pulse mode control circuit 22 switches the current path through laser 10 off and on, capacitor 44 will be discharged through laser 10 and recharged through high voltage DC power supply 36 and inductor 42. Waveform 58/70 of FIG. 3B illustrates the voltage across capacitor 44 during the on and off phases of the laser operation.

When power is first applied to high voltage DC power supply 36 and where the current path through laser tube 10 remains open, capacitor 44 charges to the potential of high voltage DC voltage supply 36 through diode 40 and inductor 42. When capacitor 44 becomes fully charged, the current through inductor 42 goes to zero as does the potential across it.

When pulse mode control circuit 22 applies a signal to the base of transistor 30 to turn on transistor 30, a current path is established through laser 10. This causes capacitor 44 to begin to discharging through laser 10. FIG. 3B portion 58 represents the voltage across capacitor 44 during this discharge. Note that the slope of this portion is constant due to the constant current conditions imposed by the current regulator 16. This portion represents the voltage across both the laser 10 and the current regulator circuit 16. Waveform 60 of FIG. 3B illustrates the voltage drop across the laser 10 itself.

Figure 3:
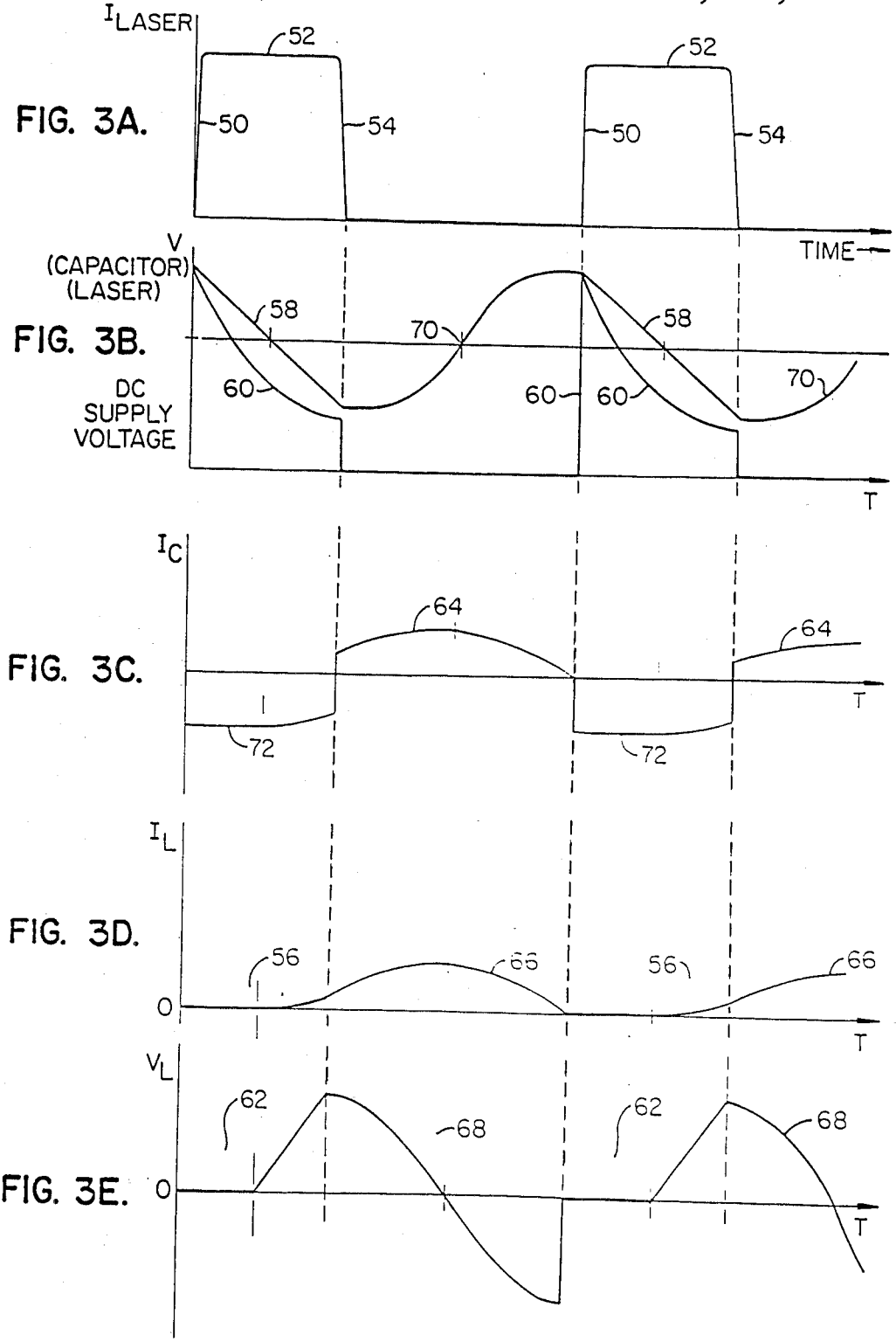
FIG. 3A illustrates the current waveform through the gas discharge laser provided by the present invention during the excitation thereof.
FIG. 3B illustrates the voltage or potential waveform provided by the present invention during the excitation of a gas discharge laser.
FIG. 3C illustrates the current waveform through the capacitor of the present invention during excitation of a gas discharge laser.
FIG. 3D illustrates the current waveform through the inductor of the present invention during excitation of a gas discharge laser.
FIG. 3E illustrates the voltage waveform across the inductor of the present invention during excitation of a gas discharge laser.

FIG. 3A illustrates the current waveform through the laser. Portion 50 corresponds to the initial breakdown of the gas column, while portion 52 represents the action of the current regulator 16; i.e. high voltage vacuum tube 18 to maintain the current through laser 10 at a predetermined level. Finally, portion 54 represents the opening of the current path by current regulator 16 at the end of the pulse from pulse mode control circuit 22.

During the last portion of the current pulse the voltage on capacitor 44 is lower than the D.C. supply 36 voltage. This difference appears across inductor 42, see FIG. 3E, portion 62, and current flow increases in the inductor, see FIG. 3D, portion 56. When current regulator 16 shuts off current through the laser tube 10, all the inductor current goes into the capacitor 44 thus recharging it for the next cycle, see FIG. 3B portion 70. This current flow continues beyond the time at which the capacitor 44 voltage and the supply 36 voltage are equal and until the energy stored in the magnetic field of the inductor is fully depleted. See FIG. 3D, portion 66. At this point the voltage on capacitor 44 is higher than the supply voltage from DC power supply 36. Current could begin flowing back through the inductor at this point except for the action of diode 40 that prevents this. Capacitor 44 is now fully recharged and the unit is ready for the next pulse.

When pulse mode control circuit 22 again turns on transistor 30, capacitor 44 is again discharged through laser 10. Again, as the current out of capacitor 44 begins to decrease and the voltage across capacitor 44 falls below the potential of high voltage DC power supply 36, current begins to flow through inductor 42 and a potential is generated across inductor 42. When pulse mode control circuit 22 again turns transistor 30 off, the potential across inductor 42 is reversed and capacitor 44 is charged to a potential equal to the potential across inductor 42 plus the potential of high voltage DC power supply 36. Diode 40 prevents discharge of capacitor 44 into high voltage DC power supply 36 when capacitor 44 is charged above a potential equal to that of high voltage DC power supply 36.

Figure 4:
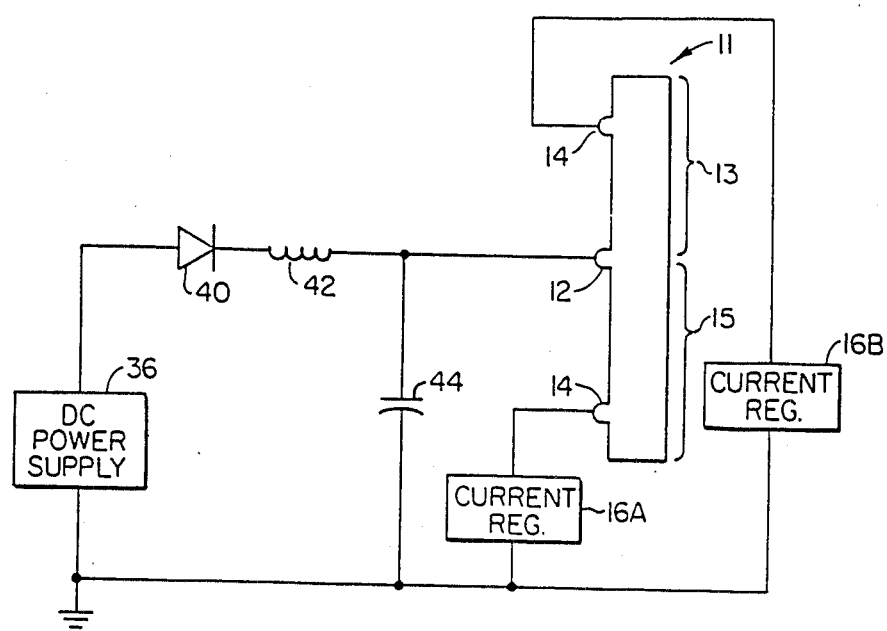
FIG. 4 illustrates the present invention as used with a laser having several discharge sections.

Note that several laser discharge sections each with its own current regulator 16A, 16B can be supplied from a single capacitor 44 that is charged by a single combination of D.C. power supply 36, diode 40 and inductor 42. See FIG. 4.

When the present invention is operated in a continuous mode, diode 40, inductor 42, and capacitor 44 have insignificant effect upon the operation of laser 10. In a continuous operative mode the current through laser 10 is constant, and the voltage across inductor 42 is zero volts. Additionally, because the voltage applied to laser 10 during this mode is constant, capacitor 44 remains at a constant voltage level and as such does not influence the current supplied to laser 10. Furthermore, in this mode currents flow into laser 10, such that diode 40 remains forward biased and conductive.

As discussed earlier, the present invention is operative so that the voltage provided to energize the laser 10 decreases to just above that required to operate laser 10 in a continuous mode after the initial breakdown has occurred. See the difference between waveform portions 58 and 60 in FIG. 3B. This results in a reduction of the amount of voltage that current regulator 16 must withstand during the current pulse. In particular, this minimizes the amount of power that must be dissipated by the regulator circuit, i.e. vacuum tube 18 and transistor 30.

In the preferred embodiment of the present invention, the value of capacitor 44 should be selected so that, at the end of the discharge pulse, the voltage across capacitor 44 is slightly greater than that required to maintain the vacuum tube 18 and transistor 30 in an ON condition plus the required discharge voltage for the laser 10. The ability to select the appropriate capacitor value is made possible by the fact that the current through laser 10 is maintained at a constant level by the current regulator circuit 16. As can be seen from FIG. 3B, portion 58, the amount of time required for the voltage across capacitor 44 to reach the desired level can be predicted by the equation $dV/dt = I/C$, where V equals the voltage across capacitor 44, t equals time, I equals current through capacitor 44, and C equals the capacitor value. Thus, given the current level, the repetition rate, the pulsewidth, and the change in voltage, the value of capacitance is defined. If multiple laser discharge sections are to be driven from a single combination of D.C. power supply 36, diode 40, inductor 42, and capacitor 44, then the value used to calculate the required capacitance must be the total current for all the connected discharge sections.

The preferred embodiment of the present invention is implemented in connection with a laser 11 having two discharge sections 13 and 15. See FIG. 4. The cathode 14 of each section has a current regulator in its current path, i.e. current regulators 16A and 16B. Typical values for current and voltage for such a laser might be 22 kilovolts for the total boosted voltage, 14 kilovolts for the voltage of the D.C. power supply 36, and 600 milliamps peak total current through both discharge sections. Where a pulsewidth of 500 microseconds is used, a value of 0.030 microfarads for capacitor 44 and a value of 30 henries for inductor 42 have been found to be satisfactory.

The present invention thus provides a high voltage power supply which permits a laser to operate in either an enhanced pulse mode or a continuous mode. The constant current operating condition of the laser coupled with the use of passive reactance components and a fixed high voltage DC power supply permit the generation of an excitation voltage substantially greater than the potential provided by the high voltage DC power supply itself. Additionally, the passive components do not effect the laser when it is operated in a continuous mode. Finally, stress on the energization circuitry can be minimized. As such, a power supply is provided for energizing a laser which is simple, low in cost, and efficient in operation.

The terms and expressions which have been employed here are used as terms of description and not of limitations, and there is no intention, in the use of such terms and expressions, of excluding equivalents of the features shown and described or portions thereof, it being recognized that various modifications are possible within the scope of the invention claimed.

We claim:

1. An energizing apparatus for gas discharge lasers having an anode and a cathode, comprising
    (a) means for providing direct current;
    (b) means coupled between the laser and the direct current means for regulating the magnitude of current flowing through the laser, said current regulating means being operable in a continuous mode and in an enhanced pulse mode in which said current regulating means are switchable between an operative and an inoperative condition;
    (c) first reactance means coupled between the direct current means and the laser means for generating a first potential which is proportional to the change in current thereto;
    (d) second reactance means coupled in shunt across the direct current means and the first reactance means for storing charge at a second potential corresponding to the sum of the first potential from the first reactance means and the potential of the direct current means; and
    (e) means connected in series with the first reactance means for restricting the flow of current to a single direction, wherein said laser is supplied with a transitory charge at the second potential and at a constant rate when the current regulating means are switched between an inoperative and an operative condition.

2. The apparatus of claim 1 wherein the first reactance means comprise an inductor.

3. The apparatus of claim 2 wherein the restricting means comprise a diode.

4. The apparatus of claim 1 wherein the second reactance means comprise a capacitor.

5. An energizing system for gas discharge lasers comprising
    (a) means for providing a direct current at a first potential;
    (b) means coupled between the laser and the direct current means for regulating the current flowing through the laser to flow at a predetermined level, including means for switching the current flowing through the laser off and on, said regulating means being operable in a continuous mode in which the current flowing through the laser is continuously at the predetermined level, and operable in an enhanced pulse mode in which the current flowing through the laser is switched between an off condition and the predetermined level;
    (c) an inductor connected between the laser and the direct current means;
    (d) a diode connected in series with the inductance means for restricting the flow of current through the inductance means to a single direction; and
    (e) a capacitor connected in shunt across the direct current means and the inductor.

* * * * *